US009105208B2

(12) United States Patent
Son et al.

(10) Patent No.: US 9,105,208 B2
(45) Date of Patent: Aug. 11, 2015

(54) METHOD AND APPARATUS FOR GRAPHIC PROCESSING USING MULTI-THREADING

(71) Applicant: Samsung Electronics Co., Ltd., Suwon-si (KR)

(72) Inventors: Sung Jin Son, Yongin-si (KR); Sang Oak Woo, Anyang-si (KR); Seok Yoon Jung, Seoul (KR); Vladislav Y. Aranov, St. Petersburg (RU); Sergey Y. Belyaev, St. Petersburg (RU); Pavel O. Smirnov, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 13/669,918

(22) Filed: Nov. 6, 2012

(65) Prior Publication Data

US 2013/0176323 A1   Jul. 11, 2013

(30) Foreign Application Priority Data

Jan. 5, 2012   (KR) ........................ 10-2012-0001594

(51) Int. Cl.
*G09G 5/00* (2006.01)
*G09G 5/36* (2006.01)
*G06T 1/20* (2006.01)
*G06T 15/00* (2011.01)
*G06F 9/50* (2006.01)

(52) U.S. Cl.
CPC .............. *G09G 5/001* (2013.01); *G06F 9/5038* (2013.01); *G06T 1/20* (2013.01); *G06T 15/005* (2013.01); *G09G 5/363* (2013.01); *G06F 2209/509* (2013.01); *G09G 2360/08* (2013.01)

(58) Field of Classification Search
CPC .. G06T 1/20; G09G 2360/06; G09G 2360/10; G06F 9/48; G06F 9/4843; G06F 9/4881; G06F 9/3836
See application file for complete search history.

(56) References Cited

U.S. PATENT DOCUMENTS

| 2004/0160446 A1 | 8/2004 | Gosalia et al. |
| 2007/0120865 A1 | 5/2007 | Ng |
| 2009/0150898 A1 | 6/2009 | Sohn et al. |
| 2009/0160863 A1 | 6/2009 | Frank |
| 2012/0194525 A1* | 8/2012 | Hartog et al. ................. 345/503 |

FOREIGN PATENT DOCUMENTS

| JP | 2006-092217 | 4/2006 |
| JP | 2006-099218 | 4/2006 |
| KR | 10-2003-0020367 | 3/2003 |
| KR | 10-2007-0045495 | 5/2007 |
| KR | 10-2008-0041047 | 5/2008 |
| KR | 10-2009-0096717 | 9/2009 |

* cited by examiner

*Primary Examiner* — Antonio A Caschera
(74) *Attorney, Agent, or Firm* — NSIP Law (57) ABSTRACT

A method and apparatus for graphic processing using multi-threading includes at least one context task, mediation task, and control task executed by a processor. The at least one context task sequentially generates graphic commands. The mediation task mediates processing of the graphic commands. The mediation task may process a particular graphic command on behalf of the at least one context task, and change a processing order of the graphic commands. The control task transmits the graphic commands to a graphic hardware.

21 Claims, 6 Drawing Sheets

METHOD AND APPARATUS FOR GRAPHIC PROCESSING USING MULTI-THREADING

CROSS-REFERENCE TO RELATED APPLICATIONS

This application claims the priority benefit of Korean Patent Application No. 10-2012-0001594, filed on Jan. 5, 2012, in the Korean Intellectual Property Office, the disclosure of which is incorporated herein by reference.

BACKGROUND

1. Field

Embodiments relate to a method and apparatus for graphic processing using multi-threading.

2. Description of the Related Art

A computer system may include two computation units, that is, a central processing unit (CPU) and a graphics processing unit (GPU).

Development of the CPU is progressing from a single type to a core type, a multi-core type, or a multi-processor type. Also, demand for a multi-core or a multi-processor with respect to a CPU used in a mobile environment is rapidly increasing. In addition, in a multi-core or multi-processor environment, a technology for simultaneous execution of a plurality of applications is in increasing demand. Accordingly, a device driver which enables a plurality of applications to manage a single CPU is now necessary.

The speed of the GPU is considerably increased in comparison to the speed of the CPU. Accordingly, demand exists for a GPU device driver which is capable of minimizing a waiting time of a CPU by efficiently managing a plurality of applications.

SUMMARY

According to an aspect of one or more embodiments, there is provided an electronic apparatus including a central processing unit (CPU) to process a command; and a graphic hardware to process a graphic command, wherein the CPU includes at least one context task to sequentially generate graphic commands; a mediation task to receive the graphic commands from each of the at least one context task and to mediate processing of the graphic commands; and a control task to receive the graphic commands from each of the at least one context task or the mediation task and to transmit the graphic commands to the graphic hardware.

Each of the at least one context task may be requested from a general program task to process the graphic commands.

The mediation task may mediate processing of the graphic commands by processing a particular graphic command on behalf of the context task.

The particular graphic command may include at least one selected from mip-map generation, shader compiling, and texture compression.

The mediation task may mediate processing of the graphic commands by changing a processing order of the graphic commands.

The mediation task may change the processing order of the graphic commands such that a plurality of graphic commands having the same context are performed in a sequential manner.

The CPU may include at least one core, and the at least one context task, the mediation task, and the control task may be executed by one of the at least one core.

The at least one context task, the mediation task, and the control task may be executed, each as a thread, in parallel.

According to an aspect of one or more embodiments, there is provided a graphic command processing method including sequentially generating graphic commands by each of at least one context task; receiving the graphic commands from each of the at least one context task by a mediation task; mediating processing of the graphic commands by the mediation task; receiving the graphic commands from each of the at least one context task and the mediation task by a control task; and transmitting the graphic commands to the graphic hardware by the control task, wherein the at least one context task, the mediation task, and the control task are executed by a central processing unit (CPU) adapted to process a command.

The graphic command processing method may further include requesting each of the at least one context task to process the graphic commands from a general program task.

The mediating may include processing a particular graphic command by the mediation task on behalf of the context task.

The mediating may include changing a processing order of the graphic commands by the mediation task.

The processing order of the graphic commands may be changed such that a plurality of graphic commands having the same context are performed in a sequential manner.

According to an aspect of one or more embodiments, there is provided an electronic apparatus including a central processing unit (CPU) including cores to process commands; and a graphic hardware to process a graphic command, wherein the CPU includes: at least one context task to sequentially generate graphic commands; a mediation task to receive the graphic commands from each of the at least one context task and to mediate processing of the graphic commands; and a control task to receive the graphic commands from each of the at least one context task or the mediation task and to transmit the graphic commands to the graphic hardware, wherein: the cores include a first core and a second core; the first core executes the at least one context task; the second core executes the control task.

Graphic commands may be executed by a native rendering interface (NRI) communication layer, and may be executed using the second core which executes the control task.

Graphic commands, which may be executed by the native rendering interface (NRI), include at least one stall, at least one draw, and a texture transmission.

Graphic commands, which may be executed in accordance with a user code, include at least one user code, at least one draw, a mip-map generation, and a flush.

According to another aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
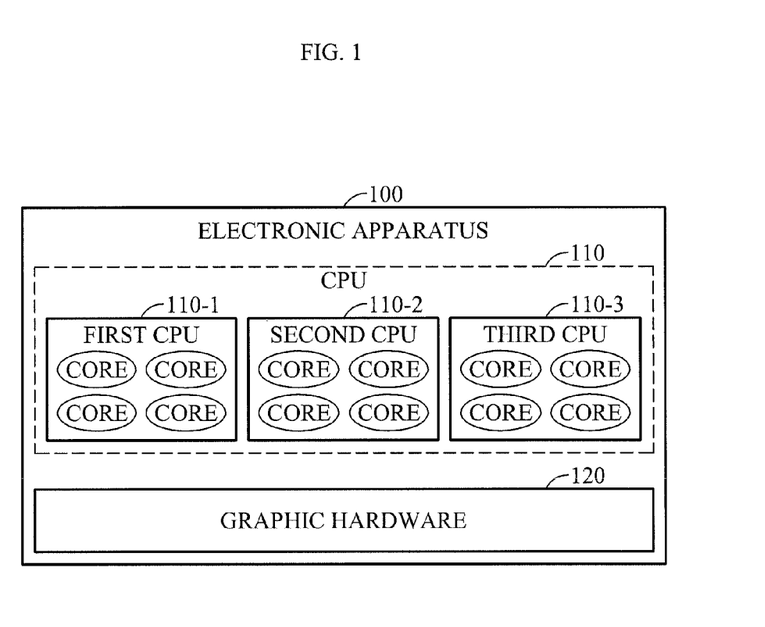
FIG. 1 illustrates an electronic apparatus according to embodiments.

FIG. 1 illustrates an electronic apparatus 100 according to embodiments.

The electronic apparatus 100 may include a central processing unit (CPU) 110 and a graphic hardware 120.

The CPU 110 may be plural in number. In FIG. 1, a plurality of CPUs including a first CPU 110-1, a second CPU 110-2, and a third CPU 110-3 are illustrated.

The CPU 110 may include at least one core. Also, each of the plurality of CPUs may include at least one core.

The CPU 110 may process a command.

The graphic hardware 120 may process a command related to graphics. The graphic hardware 120 may be a graphic processing unit (GPU).

Figure 2:
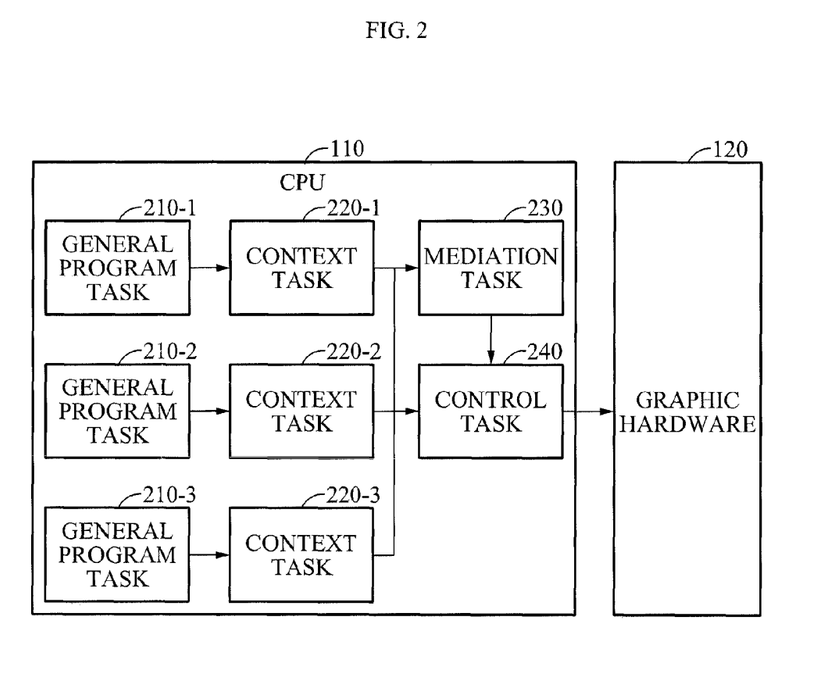
FIG. 2 illustrates tasks performed by a central processing unit (CPU) according to embodiments.

FIG. 2 illustrates tasks performed by a CPU according to embodiments.

The CPU 110 may execute at least one general program task, at least one context task, a mediation task 230, and a control task 240.

A first general program task 210-1, a second general program task 210-2, and a third general program task 210-3 are shown in FIG. 2 as the at least one general program task. A first context task 220-1, a second context task 220-2, and a third context task 220-3 are shown in FIG. 2 as the at least one context task.

Each of the at least one context task may be requested to process graphic commands from the at least one general program task. For example, the first general program task 210-1 may request the first context task 220-1 to sequentially process a series of graphic commands.

Each of the at least one context task may sequentially generate graphic commands. Each of the at least one context task may process a graphic command such as context parsing and shader compiling. Each of the at least one context task may provide graphic commands to the mediation task 230.

The mediation task 230 may receive graphic commands from each of the at least one context task. In addition, the mediation task 230 may mediate processing of the graphic commands so that the graphic hardware 120 efficiently processes the graphic commands received from the at least one context task. That is, the mediation task 230 may optimize processing of the graphic commands received from the at least one context task.

The control task 240 may receive graphic commands from the at least one context task or the mediation task 230, and transmit the received graphic commands to the graphic hardware 120. Here, transmission of the graphic commands to the graphic hardware 120 may refer to execution of the graphic commands on the graphic hardware 120.

The at least one general program task, the at least one context task, the mediation task 230, and the control task 240 may be device driver tasks related to a graphic library and a device driver. The graphic library may provide an application programming interface (API) to the at least one general program task. The general program task may request the at least one context task to process the graphic commands by calling the API. The device driver may actually control the graphic hardware 120. In addition, the device driver may provide efficient synchronization and management with respect to each task. Also, the device driver may control a multi-application to be processed by a single graphic hardware 120 based on multi-threading.

The control task 240 may transmit the graphic commands to the graphic hardware 120 by making an access to the device driver. Alternatively, the control task 240 may be a device driver accessing the graphic hardware 120. The at least one general program task, the at least one context task, the mediation task 230, and the control task 240 may be executed by one of the at least one core included in the CPU 110.

The CPU 110 may execute the at least one general program task, the at least one context task, the mediation task 230, and the control task 240, each as a thread, in parallel. When the CPU 110 includes at least one core, the threads may be allocated to each of the at least one core included in the CPU 110. That is, the at least one general program task, the at least one context task, the mediation task 230, and the control task 240, each as the thread, may be executed by the at least one core in parallel.

Figure 3:
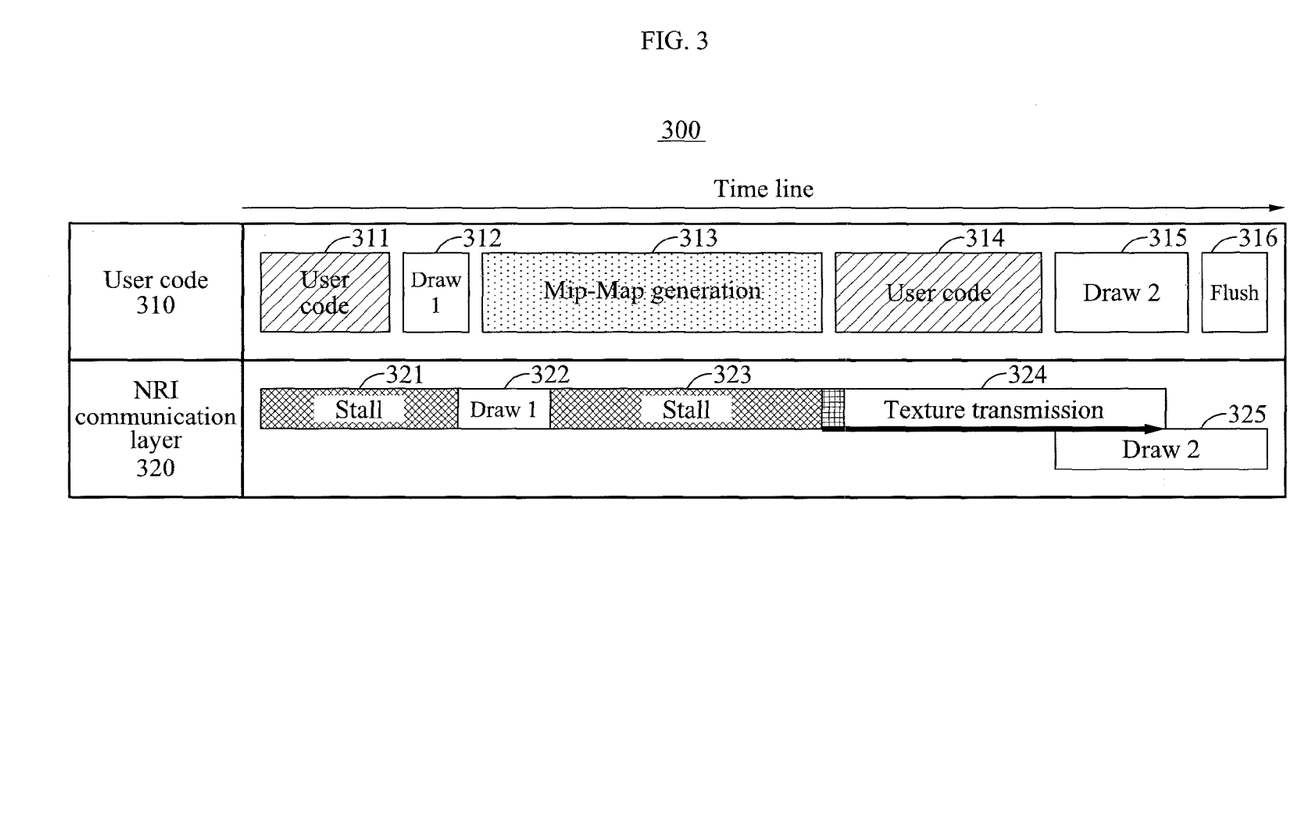
FIG. 3 illustrates processing of graphic commands, according to embodiments.

FIG. 3 illustrates processing of graphic commands, according to embodiments.

FIG. 3 shows all graphic commands 300 processed according to a time line.

In FIG. 3, commands executed by a user code 310 are shown along the time line. The commands include a user code 311, a draw 1 312, a mip-map generation 310, a user code 314, a draw 2 315, and a flush 316. The user code 310 may indicate a first graphic library API context. In addition, graphic commands executed by a native rendering interface (NRI) communication layer 320 are illustrated along the time line. The graphic commands include a stall 321, a draw 1 322, a stall 323, a texture transmission 324, and a draw 2 325.

Among the graphic commands executed by the user code 310, the user code 311 and the user code 314 may not be graphic commands. The draw commands may be commands for requesting rendering of a graphic hardware 120. The flush 316 may be a command for awaiting completion of the draw 1 312 and the draw 2 315. That is, the flush 316 may be a command executing synchronization between the user code 310 and the NRI communication layer 320.

The stall 321 and the stall 323 may indicate that no commands are executed in the NRI communication layer 320. That is, the stall 321 and the stall 323 may indicate an idle state of a control task 240.

The user code 310 may indicate commands requested by a general program task. The general program task may request a context task to process the commands of the user code 310. Accordingly, the user code 310 may indicate the commands executed by the context task.

The NRI communication layer 320 may indicate commands executed by a control task 240. The control task 240 may receive the graphic commands from the context task and transmit the received graphic commands to the graphic hardware 120.

The commands executed by the user code 310 may be executed by a first core that executes the context task among at least one core. The commands executed by the NRI communication layer 320 may be executed by a second core that executes the control task 240 among the at least one core.

The draw 1 312 may correspond to the draw 1 322. That is, the context task may perform processing on the user code for a first draw, and request the control task 240 to perform processing on the user code for the first draw. The control task 240 may request the graphic hardware 120 to process the first draw. In the same manner, the second draw 2 314 may correspond to the draw 2 325.

A texture generated by the mip-map generation 313 may be transmitted to the graphic hardware 120. The control task 240 may transmit the texture to the graphic hardware 120. Data communication such as the texture transmission may be performed by a direct memory access (DMA) scheme. That is, the data communication such as the texture transmission may not, as a whole, be directly processed by the CPU or the core. Therefore, part of the texture transmission 324 and the draw 2 325 may be executed overlapped.

Figure 4:
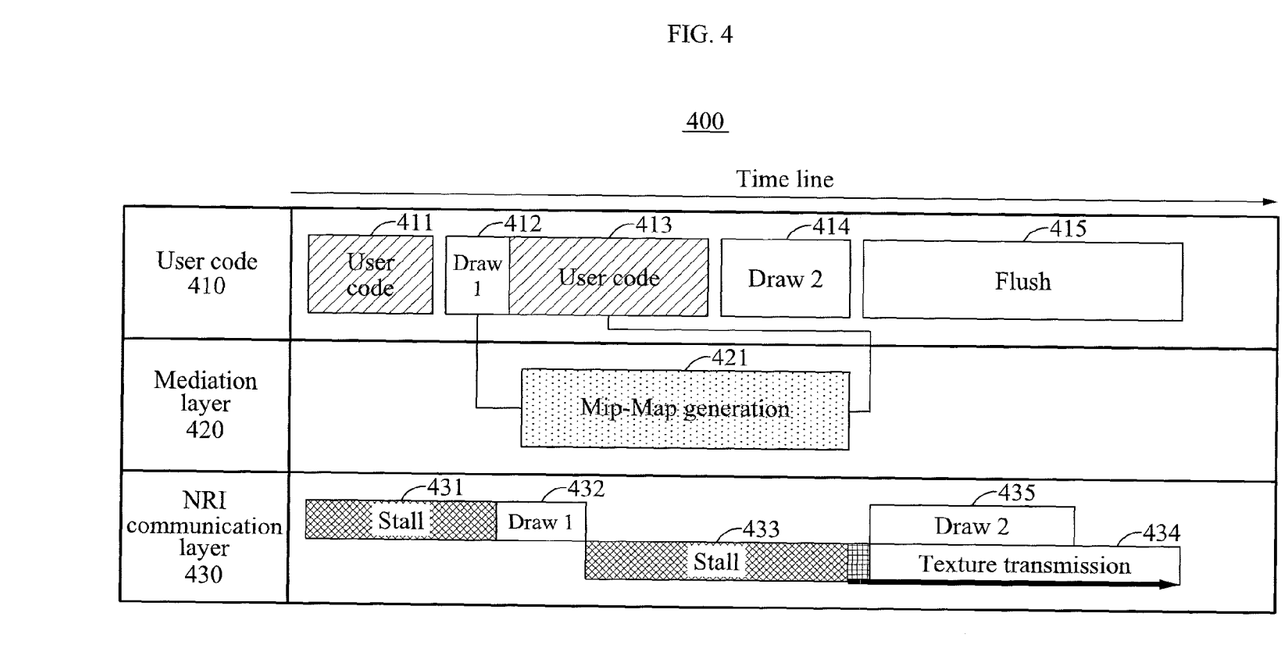
FIG. 4 illustrates mediation of processing of graphic commands by a work offload, according to embodiments.

FIG. 4 illustrates mediation of processing of graphic commands by a work offload, according to embodiments.

FIG. 4 shows all graphic commands 400 processed along a time line.

In FIG. 4, commands executed by a user code 410 are shown along the time line. The commands executed by the user code 410 include a user code 411, a draw 1 412, a user code 413, a draw 2 414, and a flush 415. The user code 410 may indicate a first graphic library API context. Also, commands executed by a mediation layer 420 are shown along the time line. A mip-map generation 421 is executed by the mediation layer 420. In addition, graphic commands executed by an NRI communication layer 430 are shown along the time line. The graphic commands include a stall 431, a draw 1 432, a stall 433, a texture transmission 434, and a draw 2 435.

The user code 410 may indicate commands requested by a general program task. The general program task may request a context task to process the commands of the user code 410. Therefore, the user code 410 may indicate the commands executed by the context task.

The mediation layer 420 may indicate commands executed by a mediation task 230. The mediation task 230 may form a command chain for a graphic hardware 120, and relay the command chain to the NRI communication layer 420 that will be described hereinafter.

The NRI communication layer 420 may indicate commands executed by a control task 240. The control task 240 may receive graphic commands from the context task or the mediation task 230, and transmit the received graphic commands to the graphic hardware 120. The control task 240 may maintain native device queues with respect to all parts of the graphic hardware 120 functioning in parallel. In addition, the control task 240 may launch NRI activities for removing the graphic hardware 120. Here, the activities may correspond to the graphic commands received by the control task 240. The control task 240 may notify the mediation layer 420, of the mediation task 230 that the activities are completed.

The commands executed by the user code 410 may be executed by a first core that executes the context task among the at least one core. The commands executed by the mediation layer 420 may be executed by a second core that executes the mediation task 230 among the at least one core. The commands executed by the NRI communication layer 430 may be executed by a third core that executes the control task 240 among the at least one core.

The mediation task 230 may process offload massive data and other miscellaneous tasks so as to reduce a load of at least one context task. That is, the mediation task 230 may perform a work offload for the at least one context task. For example, the mediation layer 420 may process the mip-map generation 421 that is processed by the context task in the embodiment of FIG. 3. The mediation task 230 may mediate processing of the graphic commands by processing a particular graphic command on behalf of the context task. The particular graphic command may include at least one selected from mip-map generation, shader compiling, and texture compression.

Since the at least one context task, the mediation task 230, and the control task 240 are executed in parallel by the at least one core, and since the mediation task 230 processes the particular graphic command that is requested to the context task, processing time for the graphic commands may be shortened. Comparing FIG. 3 to FIG. 4, since the mip-map generation 421 is processed by the mediation layer 420, the draw 2 414 may be executed more quickly than the draw 2 315. Accordingly, the draw 2 435 may be executed more quickly than the draw 2 325. Also, as aforementioned, the draw 2 435 and part of the texture transmission 434 may be redundantly executed.

As aforementioned, the mediation task 230 may mediate a load among the tasks executed as threads. Through the mediation, data to be transmitted to the graphic hardware 120 may be distributed and processed in the device driver. As a result, parallel processing by an application and the device driver may be achieved.

Furthermore, since data is processed quickly in the CPU, data transmission from the CPU to the GPU may be continuously performed. Also, efficiency of graphic command processing including rendering may be increased.

Figure 5:
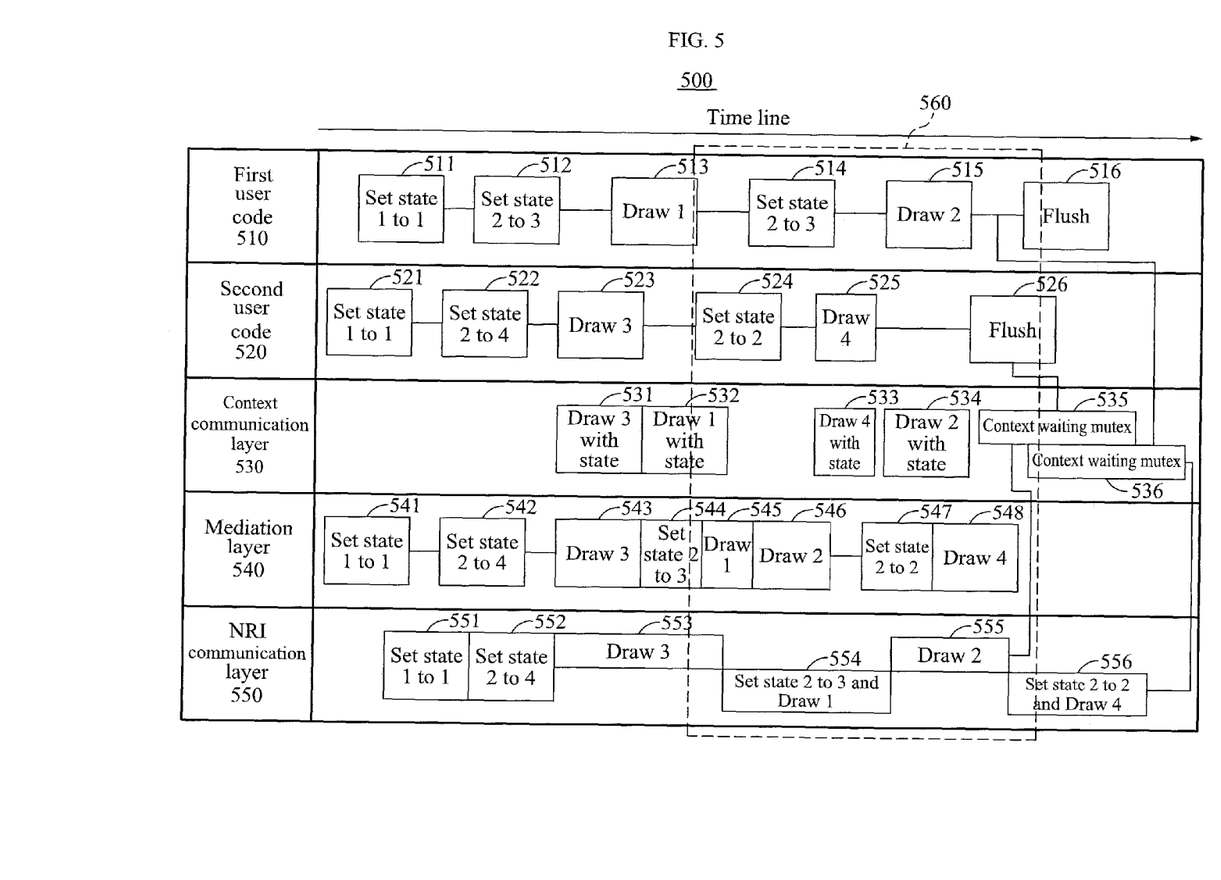
FIG. 5 illustrates mediation of processing of graphic commands by changing a processing order of a plurality of graphic commands, according to embodiments.

FIG. 5 illustrates mediation of processing of a graphic command by changing a processing order of a plurality of graphic commands, according to embodiments FIG. 5 shows all graphic commands 500 executed along a time line.

A first user code 510 may indicate a first graphic library API context. In relation to the first graphic library API context, the first user code 510 may set a state 1 and a state 2. In FIG. 5, the state may refer to a rendering context. The commands executed by the first user code 510 shown in FIG. 5 include a 'set state 1 to 1' (set state 1=1) 511, a 'set state 2 to 3' (set state 2=3) 512, a draw 1 513, a 'set state 2 to 3' (set state 2=3) 514, a draw 2 515, and a flush 516.

A second user code 520 may indicate a second graphic library API context. In relation to the second graphic library API context, the second user code 520 may set the state 1 and the state 2. Therefore, the state 1 and the state 2 may have particular values respectively by the first user code 510 and the second user code 520. The commands executed by the second user code 520 shown in FIG. 5 include a 'set state 1 to 1' (set state 1=1) 521, a 'set state 2 to 4' (set state 2=4) 522, a draw 3 523, a 'set state 2 to 2' (set state 2=2) 524, a draw 4 525, and a flush 526.

The first user code 510 and the second user code 520 may indicate commands requested by a general program task. A first general program task may request a first context task to process the commands of the first user code 510. A second general program task may request a second context task to process the commands of the second user code 520. Therefore, the first user code 510 and the second user code 520 may indicate the commands executed by the first context task and the commands executed by the second context task.

The state 1 and the state 2 may indicate whether a depth test or a stencil test is performed in each draw. Constants, for example 1, 2, 3, and 4, set as values of the state 1 or the state 2 may indicate respectively different states. For example, the constant 1 may indicate that the depth test is performed while the constant 2 indicates that the depth test is not performed. A command for setting the state may be regarded as a context change command.

A context communication layer 530 may refer to any action that occupies time and that is actually executed by a control task 240. Here, the action may refer to graphic processing, for example, rendering.

According to the graphic communication layer 530, a draw 3 with state 531, a draw 1 with state 532, a draw 4 with state 533, a draw 2 with state 534, a context waiting mutex 535, and a context waiting mutex 536 may be executed. Here, the draw with state may refer to a draw executed using a particular state value. For example, the draw 3 with state 531 may indicate that the draw 3 523 is performed with the state 1 set to 1 and the state 2 set to 4 according to the 'set state 1 to 1' 521 and the 'set state 2 to 4' 522. The context waiting mutex may indicate execution of an object that provides synchronization requested from the flush. Therefore, the draw 3 with state 531, the draw 1 with state 532, the draw 4 with state 533, the draw 2 with state 534 may correspond to the draw 3 523, the draw 1 513, the draw 4 525, and the draw 2 515, respectively.

Time may be consumed to set the state. Therefore, when a plurality of graphic commands having the same context are executed sequentially, the time consumed for setting the state of each graphic command may be removed. Here, the same context denotes that the value of the state 1 and the value of the state 2 are equal. The graphic command may include the draw. In FIG. 5, the draw 1 513 and the draw 2 515 are executed with the state 1 set to 1 and the state 2 set to 3. Therefore, when the draw 1 513 and the draw 2 515 are executed subsequently, the commands for setting the values of the state 1 and the state 2, for example, the 'set state 2 to 3' 514, may be removed.

The mediation layer 540 may indicate commands executed by a mediation task 230. The commands executed by the mediation layer 540 shown in FIG. 5 include a 'set state 1 to 1' 541, a 'set state 2 to 4' 542, a draw 3 543, a 'set state 2 to 3' 544, a draw 1 545, a draw 2 546, a 'set state 2 to 2' 547, and a draw 4 548. The commands executed by the mediation layer 540 may indicate a command for setting a state for execution of actions indicated by a context communication layer 530 and a draw command.

The draw 1 513 and the draw 3 may be executed with the state 1 set to 1. Therefore, the 'set state 1 to 1' 511 and the 'set state 1 to 1' 521 may be processed as a single 'set state 1 to 1' 541. The mediation task 230 may mediate processing of graphic commands by processing a plurality of same context change commands commonly applied to a plurality of subsequent graphic commands as a single context change command. The plurality of same context change commands may be commands for setting a particular state to a particular value.

In addition, the draw 1 and the draw 2 may be executed with the state 1 set to 1 and the state 2 set to 3. Therefore, when the draw 1 and the draw 2 are processed in a sequential manner, a command for setting a state for the draw 2 may be removed. According to an order of actions illustrated in relation to the context communication layer 530, the draw 4 546 is issued prior to the draw 2. However, in the mediation layer 540, since the mediation task 230 sequentially the draw 1 545 and the draw 2 546 having the same context, a command for setting a state for the draw 2 546, for example the 'set state 2 to 3', may be removed. As a result, the draw 2 546 may be processed prior to the draw 4.

As aforementioned, the mediation task 230 may mediate processing of the graphic commands by changing a processing order of a plurality of the graphic commands. The mediation task 230 may change the processing order of the graphic commands such that graphic commands having the same context are subsequent to one another. That is, the mediation task 230 may change the processing order of the plurality of graphic commands having different contexts or the same context in a non-overlapped 2-dimensional (2D) bounding box.

Also, the mediation task 230 may remove a context change command related to a common state of the plurality of graphic commands, by changing the processing order of the graphic commands. That is, the mediation task 230 may remove an unnecessary context for an NRI layer 550 or state switches by changing the processing order of the plurality of graphic commands. The context change command may be a command for changing a particular state to a particular value. The mediation task 230 may analyze whether contexts of the plurality of graphic commands are similar to one another to change the processing order.

According to the aforementioned mediation, the graphic commands executed by the NRI communication layer 550 are illustrated along the time line. The NRI communication layer 550 may indicate commands executed by the control task 240. The control task 240 may receive the graphic commands from the context task or the mediation task 230 and transmit the received graphic commands to the graphic hardware 120.

A 'set state 1 to 1' 551, a 'set state 2 to 4' 552, a draw 553, a 'set state 2 to 3' and draw 1 554, a draw 2 555, and a 'set state 2 to 2' and draw 4 556 are shown as the commands executed by the NRI communication layer 550. In the NRI communication layer 550, a draw command and a ° set x to y° related to the draw command may be serially executed. For example, according to the 'set state 2 to 3' and draw 1 554, the state 2 may be set to 3 while the draw 1 is immediately processed.

The commands executed by a first user code 510 may be executed by a first core that executes a first context task among at least one core. The commands executed by the second user code 520 may be executed by a second core that executes a second context task among the at least one core. The commands executed by the mediation layer 530 may be executed by a third core that executes the mediation task 230 among the at least one core. The commands executed by the NRI communication layer 540 may be executed by a fourth core that executes the control task 240 among the at least one core.

As the at least one context task, the mediation task 230, and the control task 240 are executed in parallel by at least one core, and as the mediation task 230 changes the processing order of the plurality of graphic commands, time required for processing of the graphic commands may be reduced.

Figure 6:
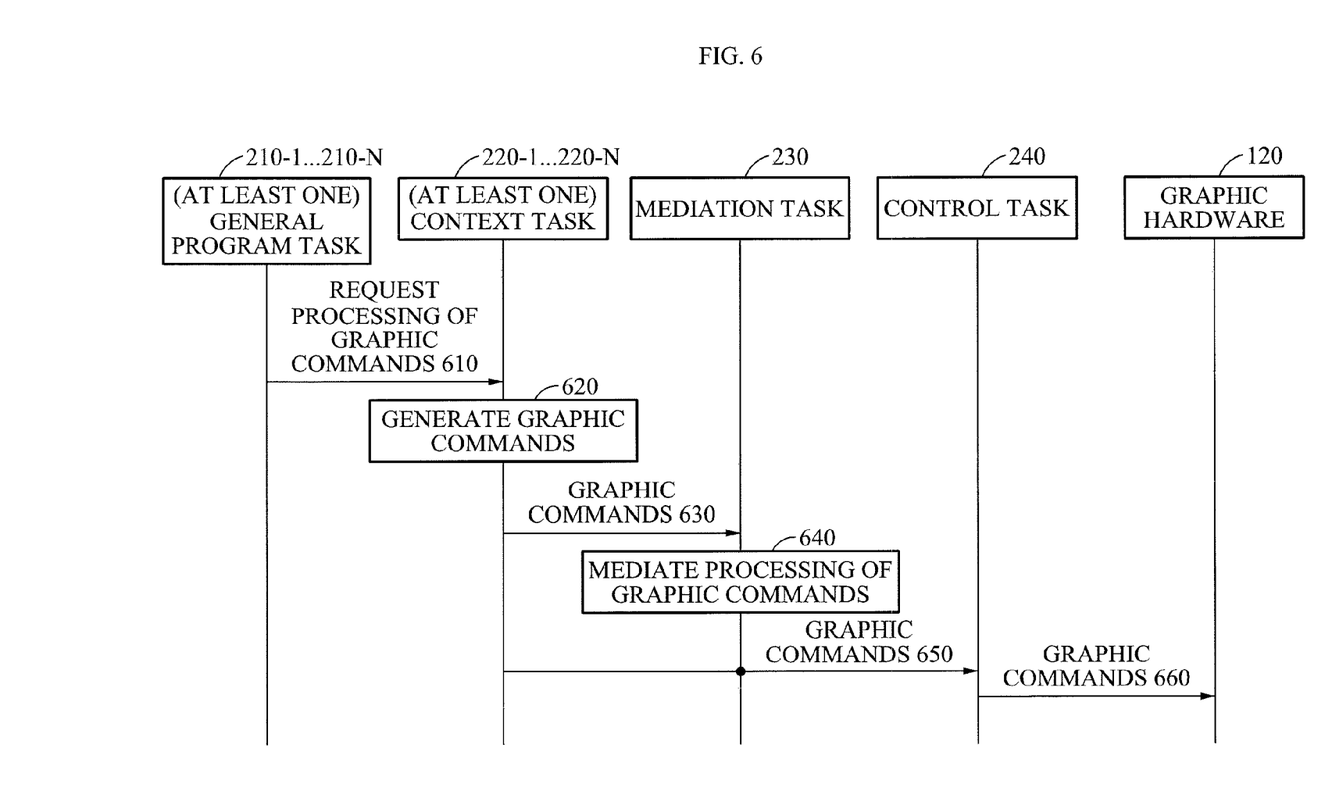
FIG. 6 illustrates a graphic processing method, according to embodiments.

FIG. 6 illustrates a graphic processing method, according to embodiments.

In operation 610, each general program task 220-1 . . . 220-N may request each of at least one context task to process graphic commands.

In operation 620, upon the request, each of the at least one context task 210-1 . . . 210-N may sequentially generate graphic commands.

In operation 630, a mediation task 230 may receive the graphic commands from each of the at least one context task.

In operation 640, the mediation task 230 may mediate processing of the graphic commands such that a graphic hardware 120 processes the graphic commands efficiently.

Operation 640 may include processing a particular graphic command by the mediation task 230 on behalf of the context task. The particular graphic command may include at least one selected from mip-map generation, shader compiling, and texture compression.

Furthermore, operation 640 may include changing a processing order of a plurality of the graphic commands by the mediation task 230. The processing order may be changed by the mediation task 230 such that a plurality of graphic commands having the same context are subsequent to one another.

In operation 650, a control task 240 may receive the graphic commands from the at least one context task or the mediation task 230.

In operation 660, the control task 240 may transmit the graphic commands to the graphic hardware 120.

The at least one context task, the mediation task 230, and the control task 240 may be executed by a CPU for executing commands.

The CPU may include at least one core. The at least one context task, the mediation task 230, and the control task 240 may be executed respectively by one core among the at least one core. Also, the at least one context task, the mediation task 230, and the control task 240 may be executed in parallel, each as a thread.

Technical features according to embodiments described with reference to FIGS. 1 to 5 may be directly applied to embodiments in FIG. 6. Therefore, a detailed description is omitted for conciseness.

Embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. The program instructions may be executed by one or more processors, processing devices, computer devices, and/or computer systems. In addition, a non-transitory computer-readable media may be distributed among processors, processing devices, computer devices, and/or computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined in the claims and their equivalents.

What is claimed is:

1. An electronic apparatus comprising:
    a central processing unit (CPU) configured to process a command; and
    a graphic hardware configured to process a graphic command,
    wherein the CPU comprises:
        at least one context task to sequentially generate graphic commands;
        a mediation task to receive the graphic commands from each of the at least one context task and selectively combine graphic commands into reordered command chains according to a system rendering context of the graphic commands to mediate processing of the graphic commands; and
        a control task to receive the graphic commands from each of the at least one context task or the mediation task and to transmit the graphic commands to the graphic hardware.

2. The electronic apparatus of claim 1, wherein each of the at least one context task is requested from a general program task to process the graphic commands.

3. The electronic apparatus of claim 1, wherein the mediation task mediates processing of the graphic commands by processing a particular graphic command on behalf of one of the at least one context task.

4. The electronic apparatus of claim 3, wherein the particular graphic command comprises at least one selected from mip-map generation, shader compiling, and texture compression.

5. The electronic apparatus of claim 1, wherein the mediation task mediates processing of the graphic commands by changing a processing order of the graphic commands.

6. The electronic apparatus of claim 5, wherein the mediation task changes the processing order of the graphic commands such that a plurality of graphic commands having the same context are performed in a sequential manner.

7. The electronic apparatus of claim 1, wherein
the CPU comprises at least one core, and
the at least one context task, the mediation task, and the control task are executed by one of the at least one core.

8. The electronic apparatus of claim 1, wherein the at least one context task, the mediation task, and the control task are executed, each as a thread, in parallel.

9. A graphic command processing method comprising:
    sequentially generating graphic commands by each of at least one context task;
    receiving the graphic commands from each of the at least one context task by a mediation task;
    selectively combining graphic commands into reordered command chains according to a system rendering context to mediate processing of the graphic commands by the mediation task;
    receiving the graphic commands from each of the at least one context task and the mediation task by a control task; and
    transmitting the graphic commands to the graphic hardware by the control task,
    wherein the at least one context task, the mediation task, and the control task are executed by a central processing unit (CPU) adapted to process a command.

10. The graphic command processing method of claim 9, further comprising requesting each of the at least one context task to process the graphic commands from a general program task.

11. The graphic command processing method of claim 9, wherein the mediating comprises processing a particular graphic command by the mediation task on behalf of one of the at least one context task.

12. The graphic command processing method of claim 11, wherein the particular graphic command comprises at least one selected from mip-map generation, shader compiling, and texture compression.

13. The graphic command processing method of claim 9, wherein the mediating comprises changing a processing order of the graphic commands by the mediation task.

14. The graphic command processing method of claim 13, wherein the processing order of the graphic commands is changed such that a plurality of graphic commands having the same context are performed in a sequential manner.

15. The graphic command processing method of claim 9, wherein
the CPU comprises at least one core, and
the at least one context task, the mediation task, and the control task are executed by one of the at least one core.

16. The graphic command processing method of claim 9, wherein the at least one context task, the mediation task, and the control task are executed, each as a thread, in parallel.

17. At least one non-transitory computer readable recording medium storing computer readable instructions that control at least one processor to implement the method of claim 9.

18. An electronic apparatus comprising:
a central processing unit (CPU) comprising cores to process commands; and
a graphic hardware to process a graphic command,
wherein the CPU comprises:
at least one context task to sequentially generate graphic commands;
a mediation task to receive the graphic commands from each of the at least one context task and selectively combine graphic commands into reordered command chains according to a system rendering context of the graphic commands to mediate processing of the graphic commands; and
a control task to receive the graphic commands from each of the at least one context task or the mediation task and to transmit the graphic commands to the graphic hardware, wherein:
the cores include a first core and a second core;
the first core executes the at least one context task; and
the second core executes the control task.

19. The electronic apparatus of claim 18, wherein graphic commands executed by a native rendering interface (NRI) communication layer are executed using the second core which executes the control task.

20. The electronic apparatus of claim 19, wherein the graphic commands executed by the native rendering interface (NRI) include at least one stall, at least one draw, and a texture transmission.

21. The electronic apparatus of claim 18, wherein the graphic commands executed in accordance with a user code include at least one user code, at least one draw, a mip-map generation, and a flush.

* * * * *